US007919925B2

(12) United States Patent
Ito et al.

(10) Patent No.: US 7,919,925 B2

(45) Date of Patent: Apr. 5, 2011

(54) LIGHTING CONTROL DEVICE OF LIGHTING DEVICE FOR VEHICLE

(75) Inventors: Masayasu Ito, Shizuoka (JP); Takanori Namba, Shizuoka (JP)

(73) Assignee: Koito Manufacturing Co., Ltd., Tokyo (JP)

( * ) Notice: Subject to any disclaimer, the term of this patent is extended or adjusted under 35 U.S.C. 154(b) by 392 days.

(21) Appl. No.: 12/167,532

(22) Filed: Jul. 3, 2008

(65) Prior Publication Data

US 2009/0009088 A1 Jan. 8, 2009

(30) Foreign Application Priority Data

Jul. 6, 2007 (JP) ................................ 2007-178314

(51) Int. Cl.
*B60Q 1/02* (2006.01)
*B60L 1/14* (2006.01)

(52) U.S. Cl. .......... 315/82; 315/219; 315/299; 315/308; 315/313; 307/10.8

(58) Field of Classification Search .................... 315/77, 315/82, 185 R, 186, 209 R, 210, 219, 291, 315/299, 307, 308, 312, 313, 324, 362; 307/10.1, 307/10.8
See application file for complete search history.

(56) References Cited

U.S. PATENT DOCUMENTS

| | | | | |
|---|---|---|---|---|
| 6,847,169 | B2 * | 1/2005 | Ito et al. | 315/77 |
| 6,867,557 | B2 * | 3/2005 | Ito et al. | 315/307 |
| 7,084,571 | B2 * | 8/2006 | Ito et al. | 315/82 |
| 7,244,036 | B2 * | 7/2007 | Murakami et al. | 362/20 |
| 7,327,051 | B2 * | 2/2008 | Ito et al. | 307/10.8 |
| 7,482,765 | B2 * | 1/2009 | Ito et al. | 315/312 |

FOREIGN PATENT DOCUMENTS

| | | |
|---|---|---|
| JP | 2006-103477 | 4/2006 |
| JP | 2007-022104 | 2/2007 |

OTHER PUBLICATIONS

Abstract of JP2006-103477, Data supplied from the esp@cenet database—Worldwide, on Jul. 1, 2008, 1 page.

Abstract of JP2007-22104, Data supplied from the esp@cenet database—Worldwide, on Jul. 1, 2008, 1 page.

* cited by examiner

*Primary Examiner* — Thuy Vinh Tran

(74) *Attorney, Agent, or Firm* — Osha • Liang LLP

(57) ABSTRACT

In a process in which a control signal having a low level is output from an ON/OFF control circuit to series regulators connected to LEDs serving as lighting targets to turn ON the LEDs in accordance with digital communication information, the ON/OFF control circuit calculates a specified current value to be supplied to the LEDs serving as the lighting targets and compares the specified current value with a detected current value which is detected by a current detecting circuit, and outputs a stop signal to a control circuit on the assumption that a current flows without the series regulators with grounding generated on a cathode side of any of LEDs when the detected current value is greater than the specified current value. When the control circuit turns OFF an NMOS transistor in response to the stop signal, an operation of a switching regulator is stopped.

6 Claims, 3 Drawing Sheets

LIGHTING CONTROL DEVICE OF LIGHTING DEVICE FOR VEHICLE

BACKGROUND OF INVENTION

1. Field of the Invention

The present invention relates to a lighting control device of a lighting device for a vehicle and, more particularly, to a lighting control device of a lighting device for a vehicle which controls a lighting operation of a semiconductor light source formed by a semiconductor light emitting device.

2. Background Art

Conventionally, there has been known a lighting device for a vehicle which uses, as a light source, a semiconductor light emitting device such as an LED (Light Emitting Diode), and a lighting control device for controlling a lighting operation of the LED is mounted on the lighting device for a vehicle of this type.

There has been known a lighting control device comprising a series regulator connected in series to an LED and serving to carry out a control for causing a specified current to flow to the LED and a switching regulator for controlling an output voltage applied to the LED to be a maximum voltage depending on a control state of the series regulator. Even if a plurality of LEDs are connected in series to or in parallel with the switching regulator, the switching regulator can control the output voltage in such a manner that a specified current flows to each of the LEDs.

In some cases, in which an output of the switching regulator is short-circuited or grounded, however, a load of the switching regulator is increased so that a failure is caused by an excessive power burden. Furthermore, in some cases, in which the output of the switching regulator is opened due to a disconnection, an output voltage is excessively raised in a switching regulator of a flyback type, for example.

Therefore, it has been proposed that an operation of each switching regulator is stopped to protect each of semiconductor light sources (LEDs) upon the assumption that a current of the semiconductor light source (LED) cannot be controlled through the series regulator when an abnormality (an abnormality caused by grounding on a cathode side of the LED) is generated on at least two of the semiconductor light sources (LEDs) (see Patent Document 1).

Moreover, it has been proposed that an operation of a switching regulator is stopped to protect each of semiconductor light sources (LEDs) upon the condition that an output voltage of the switching regulator is normal when an abnormality (an abnormality of an output voltage of a comparison amplifier which is caused by grounding on a cathode side of the LED) is caused by a reduction in a current of any of the semiconductor light sources (LEDs) (see Patent Document 2).

[Patent Document 1] JP-A-2006-103477 Publication (Pages 6 to 7, FIG. 2)

[Patent Document 2] JP-A-2007-22104 Publication (Pages 7 to 11, FIG. 1).

SUMMARY OF INVENTION

In the prior art, when an abnormality is caused on an output side of the switching regulator, for example, ground is generated on the cathode side of the LED, the abnormality is detected to protect the LED. However, individual ON/OFF operations of each of the semiconductor light sources (LEDs) is not taken into consideration.

For example, in cases in which four types of light sources, such as a high beam, a turn signal, cornering, and a DRL (Daytime Running Light), are required as a light source of a lighting device for a vehicle, a control circuit (for example, a microcomputer) for individually controlling each of four series regulators in accordance with communication information transferred from outside (information for turning ON/OFF each of the semiconductor light sources) is required as a lighting control device in addition to the switching regulator and the four series regulators.

In addition, in some cases in which the LEDs are individually turned ON/OFF even if the control circuit for individually controlling the respective series regulators in accordance with the communication information transferred from the outside is provided, all of the LEDs are not always lighting targets, rather only one of the LEDs serves as the lighting target. In the case in which only one LED (the semiconductor light source) serves as the lighting target, the LED cannot be protected by generation of grounding with a structure in which the operation of the switching regulator is stopped when an abnormality of at least two LEDs (semiconductor light sources) is detected.

In the prior art, there is additionally employed a structure in which an abnormality of each of the series regulators connected to each LED (semiconductor light source) is detected on the assumption that the LED (semiconductor light source) always serves as the lighting target In the case in which the LED is individually turned ON/OFF, therefore, the series regulator connected to the LED is not brought into an operating state even if the grounding is generated on the cathode side of the LED which does not serve as the lighting target. For this reason, it is impossible to detect the grounding.

In consideration of a variation in Vf (a forward voltage), furthermore, with a structure in which individual abnormalities of the series regulators connected to the respective LEDs are defected, a current does not flow to any of the LEDs having the grounding generated on the cathode side when the LED having smaller Vf than the LED having the grounding generated on the cathode side serves as the lighting target and a voltage is clamped by the LED. For this reason, it is impossible to detect the grounding.

One or more embodiments of the invention detect grounding on a cathode side of a plurality of semiconductor light sources with high precision when individually controlling ON/OFF operations of the semiconductor light sources.

In one or more embodiments, a first aspect of the invention is directed to a lighting control device of a lighting device for a vehicle comprising a switching regulator for supplying a current to a plurality of semiconductor light sources connected in parallel with each other, a series regulator connected in series to the semiconductor light sources, switching regulator control means for controlling an output voltage of the switching regulator, ON/OFF control means connected to the series regulator and serving to control ON/OFF operations of the semiconductor light sources based on communication information transferred from an outside and to calculate a specified current value output from the switching regulator based on the ON/OFF operations, and current detecting means provided between an output of the switching regulator and a series circuit of the series regulator or the semiconductor light source and serving to detect a current output from the switching regulator, wherein the ON/OFF control means compares a detected current value which is detected by the current detecting means with the specified current value and stops an operation of the switching regulator when the detected current value is greater than the specified current value.

When the ON/OFF operations of each of the semiconductor light sources are to be individually controlled based on the communication information transferred from the outside, the specified current value (a sum total of the currents supplied to the semiconductor light sources serving as the lighting targets) is calculated based on the ON/OFF operations of the semiconductor light source, and furthermore, the current output from the switching regulator is detected and the current value thus detected is compared with the specified current value. If the detected current value is greater than the specified current value, it is decided that a current flows without the series regulator and the grounding is generated. Therefore, it is possible to detect, with high precision, that the grounding is generated on the cathode side of any of the semiconductor light sources irrespective of the semiconductor light source serving as the lighting target or a non-lighting target. It is possible to protect the semiconductor light source from a grounding accident by stopping the operation of the switching regulator when detecting the grounding.

In one or more embodiments, a second aspect of the invention is directed to the lighting control device of a lighting device for a vehicle according to the first aspect of the invention, wherein the switching regulator includes a transformer having a plurality of secondary windings, a ratio of the secondary windings is set corresponding to a ratio of voltage drops in the semiconductor light sources connected to the secondary windings, and each of the secondary windings is provided with the current detecting means, the semiconductor light source, and the series regulator.

The switching regulator includes a transformer having a plurality of secondary windings, and a ratio of the secondary windings is set corresponding to a ratio of voltage drops in the semiconductor light sources connected to the secondary windings, and each of the secondary windings is provided with the current detecting means, the semiconductor light source and the series regulator. Also in the case in which semiconductor light sources having different voltage drops (Vfs), for example, headlamps or clearance lamps are connected to the secondary windings respectively, therefore, it is possible to individually detect grounding generated on the cathode side of any of the semiconductor light sources connected to the respective secondary windings if any.

In one or more embodiments, a third aspect of the invention is directed to the lighting control device of a lighting device for a vehicle according to the first aspect of the invention, wherein a stop period for which the series regulator is stopped is provided immediately after the switching regulator is started, and the ON/OFF control means sets the specified current value to be zero for the stop period, compares the detected current value which is detected by the current detecting means with the specified current value of zero, and stops the operation of the switching regulator when the detected current value is greater than the specified current value of zero.

The stop period for which the series regulator is stopped is provided immediately after the switching regulator is started, and the specified current value for the stop period is set to be zero and the detected current value is compared with the specified current value of zero for the stop period. If the detected current value is greater than the specified current value of zero, it is decided that the series regulator is set into a non-operating state and a current flows from the switching regulator to any of the semiconductor light sources, and grounding is generated though all of the semiconductor light sources serve as non-lighting targets. Even if the current flowing with the grounding is a microcurrent, therefore, it is possible to detect, with high precision, that the grounding is generated on the cathode side of any of the semiconductor light sources. It is possible to protect the semiconductor light source from a grounding accident before turning ON the semiconductor light source by stopping the operation of the switching regulator when detecting the grounding.

As is apparent from the description, according to the lighting control device of a lighting device for a vehicle in accordance with the first aspect of one or more embodiments of the invention, it is possible to detect, with high precision, that the grounding is generated on the cathode side of the semiconductor light source and to protect the semiconductor light source from a grounding accident.

According to the second aspect of one or more embodiments of the invention, also in the case in which the ON/OFF operations of the semiconductor light sources having different voltage drops are controlled separately, it is possible to individually detect the grounding generated on the cathode side of any of the semiconductor light sources if any.

According to the third aspect of one or more embodiments of the invention, even if the current flowing with the grounding is a microcurrent, it is possible to detect, with high precision, that the grounding is generated on the cathode side of any of the semiconductor light sources and to protect the semiconductor light source from a grounding accident before turning ON the semiconductor light source.

Other aspects and advantages of the invention will be apparent from the following description, the drawings and the claims.

DETAILED DESCRIPTION

Figure 1:
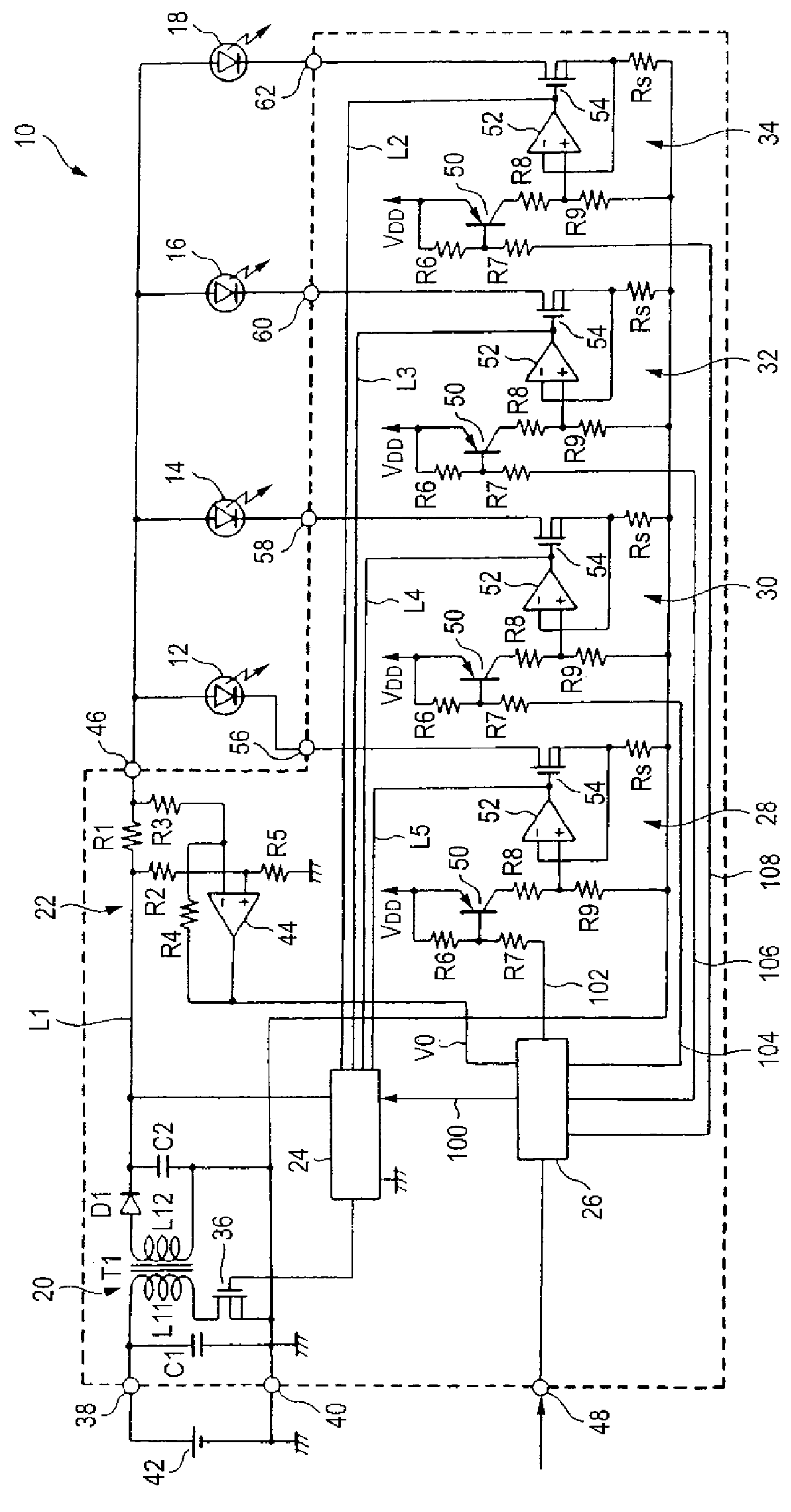
FIG. 1 is a block diagram showing a structure of a lighting control device of a lighting device for a vehicle according to a first example of one or more embodiments of the invention.
Figure 2:
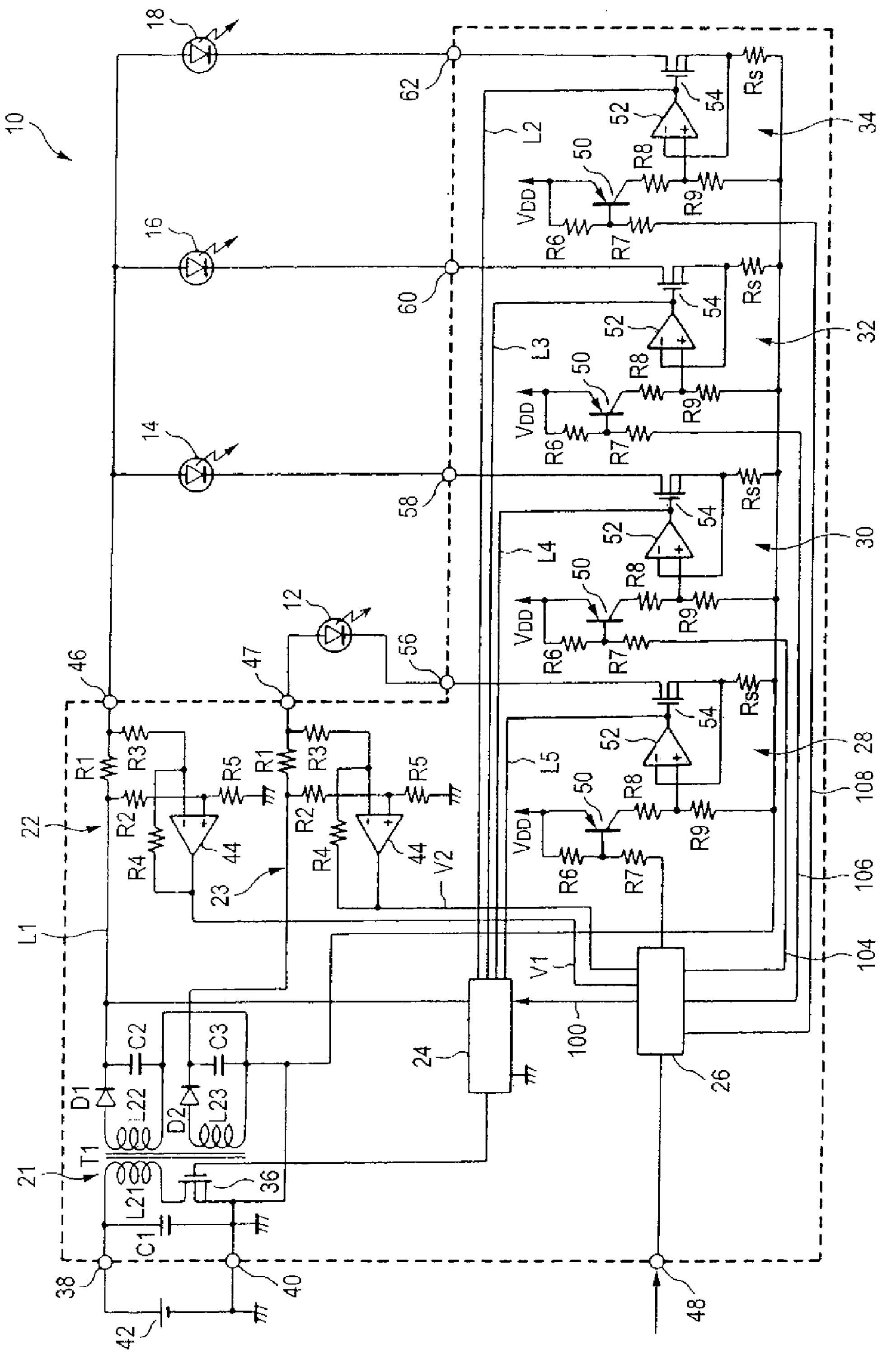
FIG. 2 is a block diagram showing a structure of a lighting control device of a lighting device for a vehicle according to a second example of one or more embodiments of the invention.
Figure 3:
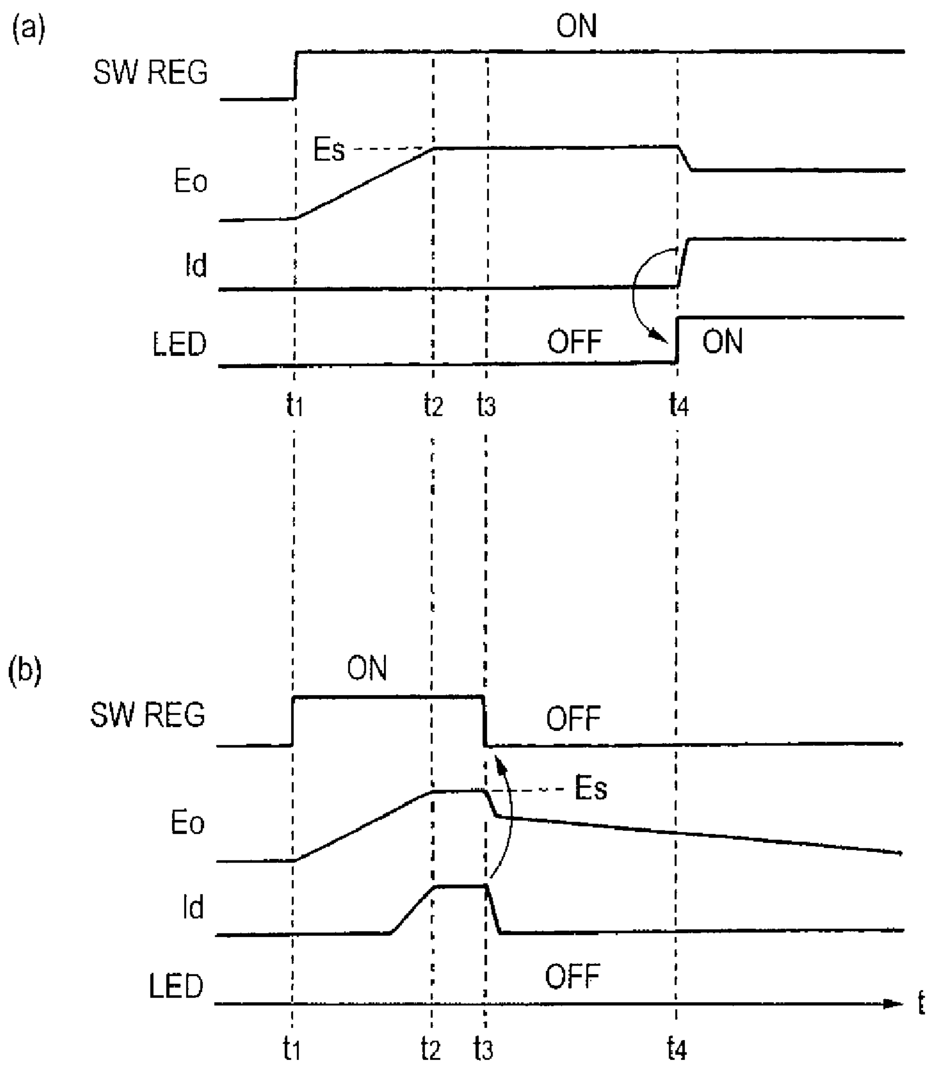
FIG. 3 is a chart for explaining an operation according to a third example of one or more embodiments of the invention, (a) being a time chart showing an operating state of each portion in a normal state and (b) being a time chart showing an operating state of each portion in grounding.

Embodiments of the invention will be described below with reference to the drawings. FIG. 1 is a block diagram showing a structure of a lighting control device of a lighting device for a vehicle according to a first example of one or more embodiments of the invention, FIG. 2 is a block diagram showing a structure of a lighting control device of a lighting device for a vehicle according to a second example of one or more embodiments of the invention, and FIG. 3 is a chart for explaining an operation according to a third example of one or more embodiments of the invention, (a) being a time chart showing an operating state of each portion in a normal state and (b) being a time chart showing an operating state of each portion in grounding.

In FIG. 1, alighting control device 10 of a lighting device (a light emitting device) for a vehicle comprises a switching regulator 20 for setting, as loads, LEDS 12, 14, 16 and 18 to be four types of light sources, a current detecting circuit 22 for detecting currents to be supplied from the switching regulator 20 to the LEDs 12, 14, 16 and 18, a control circuit 24 for controlling an output voltage of the switching regulator 20, an ON/OFF control circuit 26 for generating a control signal to individually turn ON/OFF the LEDs 12, 14, 16 and 18 in response to communication information transferred from outside, and series regulators 28, 30, 32 and 34 connected in series to the LEDs 12, 14, 16 and 18 respectively and serving to individually regulate the currents of the LEDs 12, 14, 16 and 18.

The LEDs 12, 14, 16 and 18 are connected in parallel with each other as semiconductor light sources constituted by semiconductor light emitting devices and are connected in series to the series regulators 28, 30, 32 and 34 at an output side of the switching regulator 20.

For the respective LEDs 12, 14, 16 and 18, it is also possible to use a plurality of LEDs connected in series to each other or a plurality of LEDs connected in parallel with each other. Moreover, the LEDs 12, 14, 16 and 18 can be constituted as light sources of various lighting devices for a vehicle, for example, a headlamp, a stop and tail lamp, a fog lamp, a turn signal lamp and a clearance lamp (a small lamp). For example, the LED 12 can be used as a headlamp for a high beam, the LED 14 can be used as a turn signal lamp, the LED 16 can be used as a cornering lamp and the LED 18 can be used as a DRL (Daytime Running Light).

The switching regulator 20 includes capacitors C1 and C2, a transformer T1, a diode D1 and an NMOS transistor 36, both end sides of the capacitor C1 are connected to power input terminals 38 and 40, and a node of the diode D1 and the capacitor C2 is connected to the current detecting circuit 22 and the control circuit 24, respectively. The power input terminal 38 is connected to a positive terminal of an on-vehicle battery (a DC power supply) 42 through a starting SW (not shown) of the lighting control device and the power input terminal 40 is grounded and is connected to a negative terminal of the on-vehicle battery 42.

The switching regulator 20 is constituted by an IC (Integrated Circuit), for example, and the NMOS transistor 36 is ON/OFF operated in response to a switching signal output from the control circuit 24 having a function of a calculator, for example, a switching signal having a frequency of several tens kHz to several hundreds kHz. When the NMOS transistor 36 is ON/OFF operated in response to the switching signal, a DC current generated by the ON/OFF operations flows from the power input terminal 38 to a primary winding L11 of the transformer T1, the NMOS transistor 36, and the power input terminal 40 and an AC voltage is generated on both ends of a secondary winding L12. The AC voltage generated on the secondary winding L12 is rectified by the diode D1 and is smoothed by the capacitor C2. The smoothed DC voltage is supplied to each of the LEDs 12, 14, 16 and 18 through the current detecting circuit 22.

In the switching regulator 20, an output voltage Eo is controlled by the control circuit 24. The control circuit 24 functions as switching regulator control means to monitor the output voltage Eo of the switching regulator 20 with a voltage Eo of a line L1 and to monitor a control state of the series regulator 16 with voltages of lines L2, L3, L4 and L5, and to control the output voltage Eo so as to be adapted to a voltage of any of four-system series circuits constituted by the LEDs 12, 14, 16 and 18 and the series regulators 28, 30, 32 and 34 which has the highest voltage based on the voltages of the lines L1 to L5.

Furthermore, the switching operation of the switching regulator 20 is controlled by the control circuit 24. For example, when a stop signal 100 is input from the ON/OFF control circuit 26 to the control circuit 24, the switching operation of the NMOS transistor 36 is stopped by the control circuit 24. When the switching operation of the NMOS transistor 36 is stopped, the operation of the switching regulator 20 is stopped.

The current detecting circuit 22 is constituted as current detecting means including resistors R1, R2, R3, R4 and R5 and an operational amplifier 44 and serving to detect a current (a total current) supplied from the switching regulator 20 to the LEDs 12, 14, 16 and 18, and one end side of the resistor R1 is connected to the line L1 and the other end side is connected to anodes of the LEDs 12 to 18 through a light source terminal 46.

In the current detecting circuit 22, the voltage Eo of the line L1 is input to a positive input terminal of the operational amplifier 44 through the resistor R2 and a voltage of a node of the resistors R1 and R3 is input to a negative input terminal of the operational amplifier 44 through the resistor R3 in order to differentially amplify a voltage generated through a voltage drop of the resistor R1 by the operational amplifier 44. The operational amplifier 44 differentially amplifies a voltage applied between the positive input terminal and the negative input terminal and outputs a voltage Vo obtained by the differential amplification to the ON/OFF control circuit 26. More specifically, the current detecting circuit 22 converts the current (total current) to be supplied from the switching regulator 20 to the LEDs 12, 14, 16 and 18 into the voltage Vo and outputs the voltage Vo to the ON/OFF control circuit 26.

The ON/OFF control circuit 26 is constituted by a microcomputer including a CPU (Central Processing Unit), an RAM (Random Access Memory), an ROM (Read Only Memory) and an I/O (Input/Output) interface circuit, for example, and an input side is connected to a vehicle electronic control unit (ECU) through a communicating terminal 48 and a wire harness (not shown).

The ON/OFF control circuit 26 is constituted as ON/OFF control means for identifying digital communication information for individually turning ON/OFF the respective LEDs 12 to 18 when the same digital communication information is input as external communication information from the vehicle electronic control unit (ECU) and outputting control signals 102, 104, 106 and 108 in accordance with a result of the identification to the series regulators 28, 30, 32 and 34 respectively.

Referring to the control signals 102, 104, 106 and 108, for example, a control signal corresponding to the LED to be turned ON is generated as a signal having a low level, a control signal corresponding to the LED to be turned OFF is generated as a signal having a high level, and a control signal corresponding to the LED to be turned ON with an extinction is generated as an ON/OFF signal having a duty ratio of several tens %.

Moreover, the ON/OFF control circuit 26 calculates the number of the LEDs to be turned ON based on the digital communication information (the ON indicating number) and a current of the LED to be turned ON (a specified current) and calculates the ON indicating number ×the specified current=a specified current value (a sum total of the specified currents of the LEDs which are identical to each other) or a sum total of the currents of the LEDs to be turned ON (the specified currents) (a sum total of the specified currents of the LEDs which are different from each other)=the specified current value, and compares the specified current value thus calculated with a detected current value obtained by converting the voltage Vo of the output of the current detecting circuit 22 into a current and decides the presence of grounding based on a result of the comparison.

More specifically, the ON/OFF control circuit 26 decides that the grounding is not generated when the detected current value is smaller than the specified current value which is calculated, and decides that the current flows without the series regulators 28, 30, 32 and 34, that is, the grounding is generated on the cathode side of any of the LEDs 12 to 18 when the detected current value is greater than the specified current value which is calculated, and outputs the stop signal 100 to the control circuit 24 of the switching regulator 20.

On the other hand, the respective series regulators 28, 30, 32 and 34 have identical circuit structures to each other and are constituted to include a PNP transistor 50, an operational amplifier 52, an NMOS transistor 54, a shunt resistor Rs and resistors R6 to R9, and the NMOS transistor 54 is connected as a switching device in series to the LEDs 12, 14, 16 and 18 through light source terminals 56, 58, 60 and 62 together with the shunt resistor Rs respectively. For the switching device, it is also possible to use another switching device, for example, an NPN transistor in place of the NMOS transistor 54.

The shunt resistor Rs is configured as a current detecting device for converting the current flowing to each of the LEDs 12, 14, 16 and 18 into a voltage and inputting the voltage to a negative input terminal of the operational amplifier 52. The operational amplifier 52 fetches a voltage generated on a node of the resistors R8 and R9 into a positive input terminal and fetches a voltage on both ends of the shunt resistor Rs into the negative input terminal, compares both of the voltages with each other, generates a gate voltage (a control signal) corresponding to a result of the comparison, and applies the gate voltage to a gate of the NMOS transistor 54 to control ON/OFF operations of the NMOS transistor 54. More specifically, the respective series regulators 28, 30, 32 and 34 properly control a degree of ON of the NMOS transistor 54 corresponding to the result of the comparison of the operational amplifier 52, thereby controlling the currents of the LEDs 12, 14, 16 and 18 individually in such a manner that specified currents can flow to the LEDs 12, 14, 16 and 18.

For example, when signals having a low level are output as the control signals 102, 104, 106 and 108 from the ON/OFF control circuit 26, the PNP transistor 50 is turned ON and a voltage obtained by dividing the voltage VDD through the resistors R8 and R9 is input as a reference voltage to the positive input terminal of the operational amplifier 52. At this time, the operational amplifier 52 outputs a voltage (an appropriate voltage) for causing the voltage on both ends of the shunt resistor Rs to be coincident with the reference voltage. Consequently, the NMOS transistor 54 is turned ON at such a degree that the voltage on both ends of the shunt resistor Rs and the reference voltage are coincident with each other and the specified currents flow to the respective LEDs 12, 14, 16 and 18 so that the LEDs 12, 14, 16 and 18 are turned ON.

On the other hand, when signals having a high level are output as the control signals 102, 104, 106 and 108 from the ON/OFF control circuit 26, the PNP transistor 50 is turned OFF so that the voltage is not applied to the positive input terminal of the operational amplifier 52. For this reason, a voltage having a low level is output from the operational amplifier 52 and the NMOS transistor 54 is turned OFF so that the respective LEDs 12, 14, 16 and 18 are turned OFF.

When ON/OFF signals having a duty ratio of several tens % are output as the control signals 102, 104, 106 and 108 from the ON/OFF control circuit 26, moreover, the PNP transistor 50 repeats the ON/OFF operations in response to the ON/OFF signals. Consequently, an appropriate voltage (a voltage for causing the voltage on both ends of the shunt resistor Rs to be coincident with the reference voltage) and the voltage having a low level are alternately output from the operational amplifier 52 so that the NMOS transistor 54 repeats the ON/OFF operations. For this reason, the respective LEDs 12, 14, 16 and 18 are turned ON with an extinction corresponding to the ON/OFF operations of the NMOS transistor 54.

In a process in which a control for causing the specified currents to flow to the LEDs 12, 14, 16 and 18 is carried out in the series regulators 28, 30, 32 and 34, moreover, the gate voltage (appropriate voltage) of the NMOS transistor 54 is a threshold voltage, for example, in the vicinity of 2V to 3V. In this case, if the current flowing to one of the LEDs is lower than the specified current, the gate voltage of the NMOS transistor 54 is raised. When the gate voltage of one of the NMOS transistors 54 is raised (a voltage of any of the lines L2 to L5 is raised), the control circuit 24 controls the ON/OFF operations for the NMOS transistor 36 in order to raise the output voltage of the switching regulator 20.

When the gate voltages of all of the NMOS transistors 54 are dropped to be almost equal to the threshold voltage, furthermore, the switching operation of the NMOS transistor 36 is controlled in order to reduce the output of the switching regulator 20. Therefore, the switching regulator 20 can control the output voltage in the vicinity of a voltage having the greatest variation in Vf (forward voltage) in the LEDs 12, 14, 16 and 18.

With the structure, for example, when the LED 12 is used as a headlamp for a high beam, the LED 14 is used as a turn signal lamp, the LED 16 is used as a cornering lamp and the LED 18 is used as a DRL and digital communication information for turning ON the headlamp for a high beam is input from the vehicle electronic control unit (ECU) to the ON/OFF control circuit 26, the control signal 102 having a low level is output from the ON/OFF control circuit 26 to the series regulator 28. When the PNP transistor 50 is turned ON in response to the control signal 102 having a low level, an appropriate voltage is output from the operational amplifier 52 and the NMOS transistor 54 is turned ON so that the LED 12 is turned ON. When the control signal 102 is inverted to have a high level in accordance with the digital communication information, the LED 12 is turned OFF.

When the digital communication information for turning ON the turn signal lamp, the cornering lamp or the DRL is input from the vehicle electronic control unit (ECU) to the ON/OFF control circuit 26, similarly, the control signal 102 having a low level is output from the ON/OFF control circuit 26 to the series regulators 30, 32 and 34 respectively. When the PNP transistors 50 of the series regulators 30, 32 and 34 are turned ON in response to the control signal 102 having a low level, appropriate voltages are output from the operational amplifiers 52 and the NMOS transistors 54 are turned ON so that the LEDs 14, 16 and 18 are turned ON.

More specifically, the ON/OFF control circuit 26 identifies the digital communication information transferred from the vehicle electronic control unit (ECU) and outputs the control signals 102, 104, 106 and 108 to the series regulators 28, 30, 32 and 34 in accordance with a result of the identification so that the LEDs 12, 14, 16 and 18 can be individually turned ON/OFF.

When the LED 12 serves as a lighting target, moreover, the ON/OFF control circuit 26 compares the detected current value obtained from the voltage Vo through the detection of the current detecting circuit 22 with the specified current value of the LED 12, and decides that the LEDs 12 to 18 are set in a normal state and continuously carries out a control for outputting the control signal 102 when the detected current value is equal to or smaller than the specified current value.

On the other hand, when the detected current value is greater than the specified current value, the ON/OFF control circuit 26 decides that the current flows without the series regulators 28 to 32, that is, grounding is generated on the cathode or anode side of any of the LEDs 12 to 18, and outputs the stop signal 100 to the control circuit 24. The control circuit 24 stops the switching operation of the NMOS transistor 36 in response to the stop signal 100. As a result, the switching operation of the switching regulator 20 is stopped.

When one of the LEDs 14, 16 and 18 or at least two of the LEDs 12, 14, 16 and 18 serve as the lighting targets, moreover, the ON/OFF control circuit 26 compares the detected current value obtained from the voltage Vo through the detection of the current detecting circuit 22 with the specified current value of the whole LEDs serving as the lighting targets (a sum total of the specified current values of the LEDs serving as the lighting targets), decides that the LEDs 12 to 18 are set in the normal state with the detected current value □ the specified current value and decides that the grounding is generated on the cathode or anode side of any of the LEDs 12 to 18 with the detected current value > the specified current value, and outputs the stop signal 100 to the control circuit 24. Consequently, the switching operation of the switching regulator 20 is stopped.

According to the example, the LEDs 12, 14, 16 and 18 can be individually turned ON/OFF, and furthermore, it is possible to detect with high precision, that the grounding is generated on the cathode side of any of the LEDs 12, 14, 16 and 18. Thus, it is possible to protect the LEDs 12, 14, 16 and 18 from a grounding accident.

When the current does not flow to any of the LEDs 12, 14, 16 and 18 in respect of the variation in Vf (forward voltage) (the LED having smaller Vf than the LED serves as the lighting target and the voltage is clamped by the LED) even if the grounding is generated on the cathode side of the LED, the total current is not increased by the current generated with the grounding. For this reason, the grounding cannot be detected. When the LED having the smaller Vf than the LED serves as the non-lighting target and the LED serves as the lighting target however, the current generated with the grounding flows. Even if Vf has the variation, therefore, it is possible to detect, with high precision, that the grounding is generated on the cathode side of the LED.

Next, a second example according to one or more embodiments of the invention will be described with-reference to FIG. 2. In the example, in consideration of the fact that LEDs having different Vfs are divided into two groups for use, a switching regulator 21 is used in place of a switching regulator 20 in order to apply different voltages to the LEDs belonging to the respective groups, and a current detecting circuit 23 having the same structure is provided in addition to a current detecting circuit 22 in order to detect a current to be supplied from the switching regulator 21 to the LED belonging to each of the groups. The other structures are the same as those in the first example. In LEDs 14, 16 and 18 belonging to a first group, an LED having Vf=16V is used for a lamp having a great voltage drop such as a headlamp. In an LED 12 belonging to a second group, an LED having Vf=8V is used for a clearance lamp having a smaller voltage drop than the LED to be used for a lamp such as a headlamp.

The switching regulator 21 is constituted to include capacitors C1, C2 and C3, a transformer T1, diodes D1 and D2, and an NMOS transistor 36, and both end sides of the capacitor C1 are connected to power input terminals 38 and 40. The transformer T1 includes a primary winding L21 and secondary windings L22 and L23, and the diode D1 and the capacitor C2 are connected to both ends of the secondary winding L22 and the diode D2 and the capacitor C3 are connected to both ends of the secondary winding L23. A node of the diode D1 and the capacitor C2 is connected to the current detecting circuit 22 and a control circuit 24 respectively, and a node of the diode D2 and the capacitor C3 is connected to the current detecting circuit 23.

More specifically, the current detecting circuit 22, the LEDs 14, 16 and 18 and series regulators 30, 32 and 34 are connected to the secondary winding L22 of the transformer T1, and the current detecting circuit 23, the LED 12 and a series regulator 28 are connected to the secondary winding L23.

A ratio (a winding ratio) of the secondary winding L22 to the secondary winding L23 in the transformer T1 is set corresponding to a ratio of a voltage drop in the LEDs 14, 16 and 18 connected to the secondary winding L22 to a voltage drop in the LED 12 connected to the secondary winding L23.

In the switching regulator 21, when the NMOS transistor 36 is turned ON/OFF in response to a switching signal output from the control circuit 24, a DC current generated with the ON/OFF operation flows from the power input terminal 38 to the primary winding L21 of the transformer T1, the NMOS transistor 36 and the power input terminal 40 and different AC voltages from each other are generated on both ends of each of the secondary windings L22 and L23. The AC voltage generated on the secondary winding L22 is rectified by the diode D1 and is smoothed by the capacitor C2, and the DC voltage thus smoothed is supplied to the LEDs 14 16 and 18 through the current detecting circuit 22 and a light source terminal 46.

On the other hand, the AC voltage generated on the secondary winding L23 is rectified by the diode D2 and is smoothed by the capacitor C3, and a DC voltage obtained by the smoothing is supplied to the LED 12 through the current detecting circuit 23 and a light source terminal 47.

The current (total current) supplied to the LEDs 14, 16 and 18 is detected by the current detecting circuit 22, and the current thus detected is converted into a voltage V1 and the voltage V1 is supplied to an ON/OFF control circuit 26. Moreover, the current to be supplied to the LED 12 is detected by the current detecting circuit 23, and the current thus detected is converted into a voltage V2 and the voltage V2 is supplied to the ON/OFF control circuit 26.

The ON/OFF control circuit 26 compares a first detected current value obtained from the voltage V1 through the detection of the current detecting circuit 22 with a first specified current value of the whole LEDs serving as lighting targets in the LEDs 14, 16 and 18 belonging to a first group (a sum total of specified current values of the LEDs serving as the lighting targets), and decides that the LEDs 14 to 18 are set into a normal state when the first detected current value is equal to or smaller than the first specified current value. Consequently, the operation of the switching regulator 21 is continuously carried out and the ON operation of any of the LEDs 14 to 18 which serves as the lighting target is continuously maintained. On the other hand, the ON/OFF control circuit 26 decides that grounding is generated on the cathode or anode side of any of the LEDs 14 to 18 when the first detected current value is greater than the first specified current value, and outputs a stop signal 100 to the control circuit 24. Consequently, the switching operation of the switching regulator 20 is stopped.

Moreover, the ON/OFF control circuit 26 compares a second detected current value obtained from the voltage V2 through the detection of the current detecting circuit 23 with a second specified current value obtained when the LED 12 belonging to the second group serves as the lighting target and decides that the LED 12 is set into a normal state when the second detected current value is equal to or smaller than the second specified current value. Consequently, the operation of the switching regulator 21 is continuously carried out so that the ON operation of the LED 12 is continuously maintained. On the other hand, the ON/OFF control circuit 26 decides that the grounding is generated on the cathode or anode side of the LED 12 when the second detected current value is greater than the second specified current value, and outputs the stop signal 100 to the control circuit 24. Consequently, the switching operation of the switching regulator 21 is stopped.

Thus, the currents supplied to the LEDs belonging to the respective groups are detected by the current detecting circuits 22 and 23 respectively. In the ON/OFF control circuit 26, the first detected current value through the detection of the current detecting circuit 22 is compared with the first specified current value and it is possible to detect that the grounding is generated on the cathode or anode side of any of the LEDs 14 to 18 when the first detected current value is greater than the first specified current value. In the ON/OFF control circuit 26, moreover, the second detected current value through the detection of the current detecting circuit 23 is compared with the second specified current value and it is possible to detect that the grounding is generated on the cathode or anode side of the LED 12 when the second detected current value is greater than the second specified current value.

For example, in the case in which only the LED 12 belonging to the second group serves as the lighting target in a situation in which the grounding is generated on the cathode or anode side of any of the LEDs 14, 16 and 18 belonging to the first group, it is possible to decide that the grounding is generated on the cathode or anode side of any of the LEDs 14, 16 and 18 belonging to the first group because a current of 0 A or more flows to the first group when the second detected current value ≦ the second specified current value is detected and the first detected current value > the first specified current value=0 A is detected.

According to the example, the ratio of the secondary windings L22 and L23 in the transformer T1 is set corresponding to the ratio of the voltage drop in the LEDs 14, 16 and 18 connected to the secondary winding L22 to the voltage drop in the LED 12 connected to the secondary winding L23, the current detecting circuit 22, the LEDs 14, 16 and 18 and the series regulators 30, 32 and 34 are connected to the secondary winding L22 of the transformer T1, and the current detecting circuit 23, the LED 12 and the series regulator 28 are connected to the secondary winding L23. Therefore, it is possible to individually turn ON/OFF the LEDs 14, 16 and 18 connected to the secondary winding L22 and the LED 12 connected to the secondary winding L23, respectively.

According to the example, similarly, even if the LEDs 12 to 18 having different voltage drops (Vf), for example, a headlamp and a clearance lamp are connected to the secondary windings L22 and L23, it is possible to individually detect with high precision, the grounding generated on the cathode or anode side of any of the LEDs 12 to 18 connected to the secondary windings L22 and L23 if any and to protect the LEDs 12, 14, 16 and 18 from a grounding accident.

Although the description has been given to the ON/OFF control circuit 26 in which the first detected current value through the detection of the current detecting circuit 22 is compared with the first specified current value and the second detected current value through the detection of the current detecting circuit 23 is compared with the second specified current value in the example, moreover, it is also possible to compare a third detected current value indicative of a sum total of the first detected current value and the second detected current value with a third specified current value indicative of a sum total of the first specified current value and the second specified current value and to decide that the grounding is generated on the cathode or anode side of any of the LEDs 12 to 18 when the third detected current value is greater than the third specified current value.

Next a third example according to one or more embodiments of the invention will be described with reference to FIG. 3. In the example, in consideration of an application to the first example or the second example, a switching regulator (SW REG) 20 or 21 is operated immediately after a light emitting device is started, while a stop period for which all of LEDs 12, 14, 16 and 18 are forcibly turned OFF is set for a certain period immediately after the switching regulator 20 or 21 is started, and it is decided that grounding is generated on a cathode side of any of the LEDs 12, 14, 16 and 18 when a detected current value Id of a current detecting circuit 22 or 23 is equal to or greater than zero for the stop period.

An ON/OFF control circuit 26 outputs control signals 102, 104, 106 and 108 having a high level to series regulators 28, 30, 32 and 34 in order to forcibly turn OFF all of the LEDs 12, 14, 16 and 18 for the certain period (stop period) immediately after the switching regulator 20 or 23 is started, and furthermore, specified current values of the LEDs 12, 14, 16 and 18 for the stop period are set to be zero.

Furthermore, the ON/OFF control circuit 26 monitors the detected current value Id of the current detecting circuit 22 or 23 for the stop period, outputs a control signal having a low signal to the series regulator connected to the LED serving as a lighting target in accordance with digital communication information on the assumption that a normal state is set when the detected current value Id is zero, and outputs a stop signal 100 to a control circuit 24 on the assumption that the grounding is generated when the detected current value Id is greater than zero.

More specifically, as shown in FIG. 3(*a*), when the switching regulator (SW REG) 20 or 21 is started (ON) at a timing t1, the control signals 102, 104, 106 and 108 having a high level are output from the ON/OFF control circuit 26 to the series regulators 28, 30, 32 and 34 so that an NMOS transistor 54 of each of the series regulators 28, 30, 32 and 34 is held in an OFF state. Then, an output voltage Eo of the switching regulator (SW REG) 20 or 21 is raised to be a specified voltage Es before a timing t2. The specified voltage Es is set to be equal to or higher than a maximum voltage of a variation in Vf in the LEDs 12 to 18.

Also, in a process in which the output voltage Eo of the switching regulator (SW REG) 20 or 21 reaches the specified voltage Es or after the specified voltage Es is reached, whether the detected current value Id of the current detecting circuit 22 or 23 is equal to or greater than zero is monitored in the ON/OFF control circuit 26. The ON/OFF control circuit 26 outputs a control signal having a low level to the series regulator connected to the LED serving as the lighting target and turns ON the LED serving as the lighting target after a timing t4 assuming that the LEDs 12 to 18 are set into a normal state on condition that the detected current value Id of the current detecting circuit 22 or 23 is zero for the stop period of the timings t1 to t4.

On the other hand, as shown in FIG. 3(*b*), when the detected current value Id of the current detecting circuit 22 or 23 is greater than zero in the process in which the output voltage Eo of the switching regulator (SW REG) 20 or 21 reaches the specified voltage Es, the ON/OFF control circuit 26 outputs the stop signal 100 to the control circuit 24 in the timing t3 assuming that grounding is generated on the cathode or anode side of any of the LEDs 12 to 18 on condition that the detected current value Id of the current detecting circuit 22 or 23 is greater than zero for the period of the timings t2 to t3. Consequently, the operation of the switching regulator 20 or 21 is stopped (OFF) so that each of the LEDs is maintained in an OFF state.

Even if a ground current is very small, for example, 0.01 A, it is possible to easily distinguish 0 A from 0.01 A. Therefore, it is possible to detect the grounding with high precision even if a very small ground current flows for the stop period.

More specifically, in respect of the variation in Vf of the LED and a VF. If property of the LED, in the case in which the stop period is not provided but the switching regulator 20 or 21 and any of the series regulators 28, 30, 32 and 34 which is connected to the LED serving as the lighting target are started at the same time in a situation in which a microcurrent, for example, 0.01 A flows to the LED in which the grounding is generated on a cathode side and a specified current, for example, 2.1 A flows to the LED serving as the lighting target, a specified current of 2.1 A is compared with a detected current value of 2.11 A if any. In order to detect 0.01 A in 2.11 A it is necessary to detect an abnormality with precision of 0.5%. Thus, it is hard to detect the abnormality.

On the other hand, even if the detected current value Id is 0.01 A for the stop period in which all of the LEDs are set in an OFF state (a period for which the specified current values for all of the LEDs are set to be zero), it is sufficient that 0 A and 0.01 A are distinguished from each other. Even if a very small ground current flows for the stop period, therefore it is possible to detect the grounding with high precision.

According to this example, the certain period immediately after the switching regulator 20 or 21 is started is set to be the stop period for which the operations of all of the series regulators 28, 30, 32 and 34 are stopped, and furthermore, the specified current values of the LEDs 12, 14, 16 and 18 for the stop period are set to be zero. When the detected current value Id of the current detecting circuit 22 or 23 is greater than zero for the stop period, the operation of the switching regulator 20 or 21 is stopped on the assumption that the grounding is generated. Before turning ON the LEDs 12 to 18, therefore, it is possible to protect the LEDs 12 to 18 from a grounding accident.

Additionally, according to this example, it is decided that the grounding is generated on condition that the detected current value Id of the current detecting circuit 22 or 23 is greater than zero for the stop period. Even if the current generated with the grounding is very small, therefore, it is possible to detect with high precision, that the grounding is generated on the cathode or anode side of any of the LEDs 12 to 18.

In the first to third examples, furthermore, it is also possible to directly stop the switching operation of the switching regulator 20 through the ON/OFF control circuit 26 by outputting the stop signal 100 from the ON/OFF control circuit 26 to the NMOS transistor 36 to turn OFF the NMOS transistor 36 in the detection of the grounding without outputting the stop signal 100 from the ON/OFF control circuit 26 to the control circuit 24.

While description has been made in connection with exemplary embodiments of the present invention, those skilled in the art will understand that various changes and modification may be made therein without departing from the present invention. It is aimed, therefore, to cover in the appended claims all such changes and modifications falling within the true spirit and scope of the present invention.

DESCRIPTION OF THE REFERENCE NUMERALS AND SIGNS

10 lighting control device of lighting device for vehicle
12, 14, 16, 18 LED
20, 21 switching regulator
22, 23 current detecting circuit
24 control circuit
26 ON/OFF control circuit
28, 30, 32, 34 series regulator
36 NMOS transistor
44 operational amplifier
50 PNP transistor
52 operational amplifier
54 NMOS transistor

What is claimed is:

1. A lighting control device of a lighting device for a vehicle comprising:
   - a switching regulator for supplying a current to a plurality of semiconductor light sources connected in parallel with each other;
   - a series regulator connected in series with the semiconductor light sources;
   - switching regulator control device for controlling an output voltage of the switching regulator;
   - ON/OFF control device connected to the series regulator and serving to control ON/OFF operations of the semiconductor light sources based on communication information transferred from outside and to calculate a specified current value output from the switching regulator based on the ON/OFF operations; and
   - current detecting device provided between an output of the switching regulator and a series circuit of the series regulator or the semiconductor light source and serving to detect a current output from the switching regulator, wherein the ON/OFF control device compares a detected current value which is detected by the current detecting device with the specified current value and stops an operation of the switching regulator when the detected current value is greater than the specified current value.

2. The lighting control device of a lighting device for a vehicle according to claim 1, wherein the switching regulator includes a transformer having a plurality of secondary windings, a ratio of the secondary windings is set corresponding to a ratio of voltage drops in the semiconductor light sources connected to the secondary windings, and each of the secondary windings is provided with the current detecting device, the semiconductor light source, and the series regulator.

3. The lighting control device of a lighting device for a vehicle according to claim 1, wherein a stop period for which the series regulator is stopped is provided immediately after the switching regulator is started, and the ON/OFF control device sets the specified current value to be zero for the stop period, compares the detected current value which is detected by the current detecting device with the specified current value of zero, and stops the operation of the switching regulator when the detected current value is greater than the specified current value of zero.

4. A lighting control device of a lighting device for a vehicle comprising:
   - a switching regulator for supplying a current to a plurality of semiconductor light sources connected in parallel with each other;
   - a series regulator connected in series with the semiconductor light sources;
   - an ON/OFF controller connected to the series regulator and serving to control ON/OFF operations of the semiconductor light sources based on communication information transferred from outside and to calculate a specified current value output from the switching regulator based on the ON/OFF operations; and current detector provided between an output of the switching regulator and a series circuit of the series regulator or the semiconductor light source and serving to detect a current output from the switching regulator, wherein the ON/OFF controller compares a detected current value which is detected by the current detector with the specified current value and stops an operation of the switching regulator when the detected current value is greater than the specified current value.

5. The lighting control device of a lighting device for a vehicle according to claim 4, wherein the switching regulator includes a transformer having a plurality of secondary windings, a ratio of the secondary windings is set corresponding to a ratio of voltage drops in the semiconductor light sources connected to the secondary windings, and each of the secondary windings is provided with the current detector, the semiconductor light source, and the series regulator.

6. The lighting control device of a lighting device for a vehicle according to claim 4, wherein a stop period for which the series regulator is stopped is provided immediately after the switching regulator is started, and the ON/OFF controller: sets the specified current value to be zero for the stop period, compares the detected current value which is detected by the current detector with the specified current value of zero, and stops the operation of the switching regulator when the detected current value is greater than the specified current value of zero.

* * * * *